US008073680B2

(12) United States Patent
Georgiev et al.

(10) Patent No.: US 8,073,680 B2
(45) Date of Patent: Dec. 6, 2011

(54) LANGUAGE DETECTION SERVICE

(75) Inventors: Dimiter Georgiev, Bellevue, WA (US);
Shenghua Ye, Sammamish, WA (US);
Gerardo Villarreal Guzman,
Woodinville, WA (US); Kieran Snyder,
Seattle, WA (US); Ryan M. Cavalcante,
Seattle, WA (US); Tarek M. Sayed,
Sammamish, WA (US); Yaniv Feinberg,
Redmond, WA (US); Yung-Shin Lin,
Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 12/147,340

(22) Filed: Jun. 26, 2008

(65) Prior Publication Data

US 2009/0326918 A1 Dec. 31, 2009

(51) Int. Cl.
*G06F 17/20* (2006.01)

(52) U.S. Cl. .................................. 704/8; 704/9; 704/257

(58) Field of Classification Search .................. 704/277, 704/1–10, 257, 251; 345/469.1
See application file for complete search history.

(56) References Cited

U.S. PATENT DOCUMENTS

| 5,548,507 | A | 8/1996 | Martino | |
|---|---|---|---|---|
| 5,966,637 | A | 10/1999 | Kanungo | |
| 6,002,998 | A | 12/1999 | Martino | |
| 6,047,251 | A * | 4/2000 | Pon et al. | 704/1 |
| 6,157,905 | A * | 12/2000 | Powell | 704/2 |
| 6,167,369 | A | 12/2000 | Schulze | |
| 6,321,372 | B1 | 11/2001 | Poirier | |
| 6,338,033 | B1 | 1/2002 | Bourbonnais | |
| 6,363,433 | B1 | 3/2002 | Nakajima | |
| 6,366,906 | B1 | 4/2002 | Hoffman | |
| 6,553,385 | B2 | 4/2003 | Johnson | |
| 6,560,596 | B1 | 5/2003 | Margulies | |
| 6,654,741 | B1 | 11/2003 | Cohen | |
| 6,701,364 | B1 | 3/2004 | Meyer | |
| 6,718,519 | B1 | 4/2004 | Taieb | |
| 6,951,008 | B2 | 9/2005 | Quaile | |
| 7,035,801 | B2 | 4/2006 | Jimenez-Feltstrom | |
| 7,177,799 | B2 | 2/2007 | Calcagno | |
| 7,191,116 | B2 | 3/2007 | Alpha | |
| 7,228,501 | B2 | 6/2007 | Brown et al. | |
| 7,260,574 | B2 | 8/2007 | McConnell | |
| 7,295,966 | B2 | 11/2007 | Barklund | |
| 7,315,810 | B2 | 1/2008 | Azzam | |
| 7,346,511 | B2 | 3/2008 | Privault et al. | |
| 7,552,045 | B2 | 6/2009 | Barliga et al. | |
| 7,818,165 | B2 * | 10/2010 | Carlgren et al. | 704/8 |
| 8,019,596 | B2 | 9/2011 | Georgiev | |

(Continued)

FOREIGN PATENT DOCUMENTS

WO WO-2007051246 5/2007

OTHER PUBLICATIONS

"Unicode Technical Standard", Retrieved from http://unicode.org/reports/tr39/#Mixed_Script_Detection on Mar. 14, 2008., 14 Pages.

(Continued)

*Primary Examiner* — Huyen X. Vo (57) ABSTRACT

Language detection techniques are described. In implementation, a method comprises determining which human writing system is associated with text characters in a string based on values representing the text characters. When the values are associated with more than one human language, the string is compared with a targeted dictionary to identify a corresponding human language associated with the string.

19 Claims, 8 Drawing Sheets

U.S. PATENT DOCUMENTS

| | | |
|---|---|---|
| 2004/0078191 A1 | 4/2004 | Tian |
| 2004/0078204 A1 | 4/2004 | Segond |
| 2004/0088438 A1 | 5/2004 | Madril |
| 2005/0091035 A1 | 4/2005 | Kaplan |
| 2006/0026518 A1 | 2/2006 | Jung |
| 2006/0047690 A1 | 3/2006 | Humphreys |
| 2006/0074630 A1 | 4/2006 | Chelba |
| 2006/0184357 A1 | 8/2006 | Ramsey |
| 2006/0229865 A1 | 10/2006 | Carlgren |
| 2007/0242071 A1* | 10/2007 | Harding ................ 345/469.1 |
| 2007/0260520 A1 | 11/2007 | Jha |
| 2009/0324005 A1 | 12/2009 | Georgiev |
| 2009/0326920 A1 | 12/2009 | Georgiev |
| 2009/0327860 A1 | 12/2009 | Georgiev |

OTHER PUBLICATIONS

Li, Shanjian et al., "A composite approach to language/encoding detection", Retrieved from http://www.mozilla.org/projects/intl/UniversalCharsetDetection.html on Mar. 14, 2008., 17 Pages.

"LanguageIdentifier.com", Retrieved from http://www.lextek.com/langid/li/ on Mar. 14, 2008., 2 Pages.

"Google Notebook Browser Extension", Retrieved from http://pinkflamingoresources.blogspot.com/2007/10/google-notebook-browser-extension.html on Mar. 14, 2008., 3 Pages.

"NDS Browser", Retrieved from http://www.novell.com/hungary/internet/ONLINE/ADMIN/NDS.HTM on Mar. 14, 2008., 7 Pages.

"Name-to-Thing (N2T) Resolver", Retrieved from http://n2t.info/ on Mar. 14, 2008., 6 Pages.

"Non-Final Office Action", U.S. Appl. No. 12/147,389, (Jan. 19, 2011),10 pages.

"XeLDA White Paper", *TEMIS*, Available at <http://www.temis.com/fichiers/t_downloads/file_55_Xelda_WP.pdf>,(2003),32 Pages.

Atserias, J. et al., "FreeLing 1.3: Syntactic and Semantic Services in an Open-Source NLP Library", Retrieved from: <http://www.lsi.upc.edu/~nlp/papers/2006/lrec06-accgpp.pdf> on Mar. 13, 2008, (2006),6 Pages.

Englmeier, Kurt et al., "Adapting the Communication Capacity of Web Services to the Language of their User Community", *ICWS 2004*, Available at <http://www.irit.fr/recherches/IRI/SIG/personnes/mothe/pub/ICWS04.pdf>,(Jul. 20, 2004),9 Pages.

Kikui, Gen-Itiro "Identifying the Coding System and Language of On-line Documents on the Internet", *Coling '96*, Available at <http://citeseer.ist.psu.edu/cache/papers/cs/22951/http:zSzzSzwww.slt.atr.co.jpzSz~gkikuizSzpaperszSz9608KikuiCOLING.pdf/kikui96identifying.pdf>,(1996),6 Pages.

Suzuki, Izumi et al., "A Language and Character Set Determination Method Based on N-gram Statistics", *ACM Transactions on Asian Language Information Processing*, vol. 1, No. 3, Available at <http://delivery.acm.org/10.1145/780000/772759/p269-suzuki.pdf?key1=772759&key2=4420745021&coll=GUIDE&dl=GUIDE&CFID=59253019&CFOTKEN=83418411>,(Sep. 2002),pp. 269-278.

"Notice of Allowance", U.S. Appl. No. 12/147,389, (Apr. 29, 2011),12 pages.

"Non-Final Office Action", U.S. Appl. No. 12/147,284, (Jul. 20, 2011), 11 pages.

"Notice of Allowance", U.S. Appl. No. 12/147,284, (Sep. 22, 2011), 6 pages.

* cited by examiner

LANGUAGE DETECTION SERVICE

BACKGROUND

Text data may be expressed in a multitude of human understandable languages (human languages) that implement different human writing systems to communicating content. For example, while the Chinese language uses numerous text characters to express content, human languages using Latin text characters may reuse common text characters that are combined phonetically and arranged in different ways to express content. An application that makes use of text data expressed in a human language may support multiple human languages that utilize different human writing systems to express the underlying content. However, the application may be inefficient when accounting for the multitude of human languages.

SUMMARY

Language detection techniques are described. In implementation, determination is made as to which human writing system is associated with text characters in a string of one or more text characters based on values representing the text characters. When the values are associated with more than one human language, the string is compared with a targeted dictionary to identify a particular human language associated with the string.

In an implementation, a system includes a language detection service to identify which human writing system is associated with a string of text characters in a text. The language detection service identifies a human language by comparing the string with a targeted dictionary including a plurality of strings associated with the human language.

In an implementation, one or more computer-readable media comprise instructions that are executable by a computer to determine which human writing system is associated with a string of text characters based on values representing the text characters in the string. When the values are associated with more than one human language, the string is compared with a targeted dictionary, including a plurality of strings, in which individual strings in the targeted dictionary are associated with a corresponding human language, to identify the corresponding human language associated with the string.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The terms "service" and/or "module," for instance, may refer to system(s), computer-readable instructions (e.g., one or more computer-readable storage media having executable instructions) and/or procedure(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Traditionally, an application making use of text data includes one or more services to perform functions with the text data. For example, a word processing application may include a spelling service that checks the text data to ensure that the text data conforms to a human language. Applications making use of text data may be complex as a multitude of human languages exist and human languages implement a wide variety of human writing systems and conventions to express content. Consequently, operation of an application interacting with human text may be inefficient as the application accounts for the multitude of human languages and human writing systems.

Script detection service techniques are described. In an implementation a determination is made as to which human writing system is associated with individual text characters in a string of one or more text characters. For example, the determination may include scanning values representing individual text characters in a string. A designation may be made to associate a particular human writing system with the string based on the determination as to which human writing system is associated with values representing the individual text characters in the string.

In an implementation, a range of positions in a text for the one or more characters are indicated. For example, a communication may be formed that associates the particular human writing system with the range of positions in the text occupied by the one or more characters included in the string.

When more than one human writing system is associated with the individual text characters included in the string, the particular human writing system may be a language that incorporates text characters from a base human language. For example, when a string includes a first text character that is Chinese and a second text character that is Japanese, the string may be designated as Japanese as the Japanese language incorporates Chinese text characters.

In one or more embodiments, script detection techniques may be employed as an independent service or may be implemented as part of language detection service techniques. Further discussion of script detection techniques may be found in relation to FIGS. 4, 7 and 8.

Language detection service techniques are also described. In an implementation, a determination is made as to which human writing system is associated with text characters, represented by values, in a string. For example, values representing text characters in a string may be scanned to determine which human writing system is associated with the text characters forming the string. When the values are associated with more than one human writing system, the string is compared to a targeted dictionary to identify a particular human language associated with the string. In further implementations, a human language associated with a text including the string is assigned based on the string. For example, the string may be compared with the targeted dictionary to identify whether the text including string is to be assigned, for example, the English language. Further discussion of language detection techniques may be found in relation to FIGS. 4, 5, 7 and 8.

In another implementation, the human language associated with the string is ascertained based on a substring in the string. For example, the word "riding" may be parsed to the suffix "-ing" so that the English language is associated with the word "riding".

In a further implementation, selection of which strings included in the targeted dictionary are to be used for comparison may be based on the determination. For example, when the string includes Latin text characters, Latin based strings in the targeted dictionary may be considered, e.g., English, French, German, or Italian.

In the following discussion, an "Example Environment" is first described (FIGS. 1-3) that may employ script detection and/or language detection service techniques. The "Example Environment" is discussed with respect to interacting with an application through a platform. While example techniques, systems and approaches are generally described in FIGS. 1-3, in other implementations, the script detection service and/or language detection service may be implemented in other environments and configurations. Discussions related to other linguistic services are included to highlight interactions between a script detection service, a language detection service, the platform, one or more applications, other linguistic services and so on. "Example Procedures" are also described that may be employed in the example environments, as well as in other environments. Although these, systems and techniques are described as employed in a computing environment in the following discussion, it should be readily apparent that these structures, modules, techniques and approaches may be incorporated in a variety of environments without departing from the spirit and scope thereof. In addition, while text and text data are discussed the methods, techniques, approaches, service, modules and so on may be configured to implement other encoded information. For example, a service may be configured to recognize property information for a video file.

Example Environment

Figure 1:
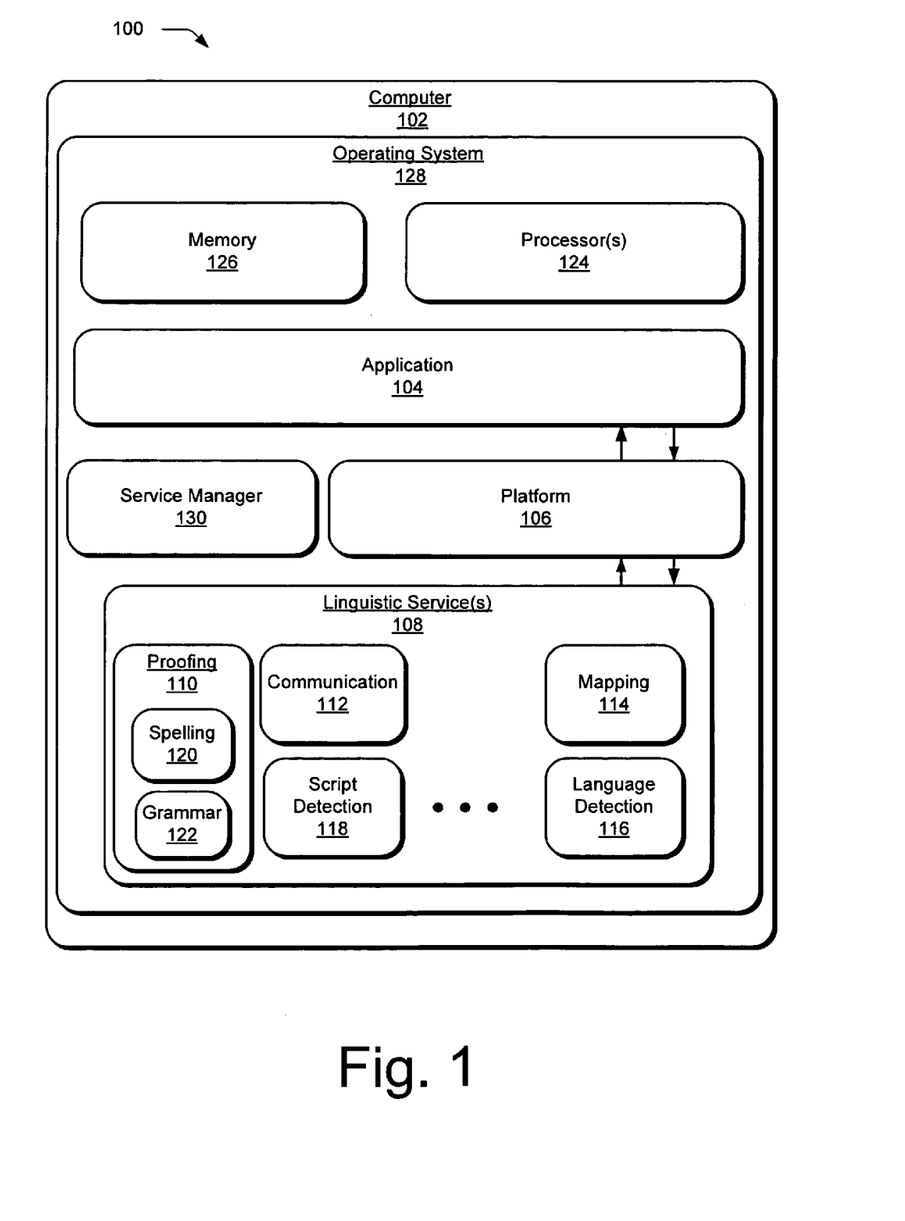
FIG. 1 is an illustration of an environment in an example implementation that is operable to employ brokered communication techniques.

FIG. 1 is an illustration of an environment 100 in accordance with one or more embodiments. The environment 100 includes a computer 102 having one or more applications 104 (one is illustrated) and one or more linguistic services 108 communicating with the application 104 through a platform 106. The linguistic services 108 are representative of functionality to recognize text property information associated with text data in a text. The linguistic services 108 may be available to perform one or more functions for the application 104. For example, as illustrated, the linguistic services 108 may include a proofing service 110, a communication service 112, a mapping service 114, a language detection service 116, a script detection service 118 and so on. In one or more embodiments, the linguistic services 108 may be plugins to the platform 106. For example, the platform 106 may host the linguistic services 108.

The linguistic services 108 may include modules (e.g., subservices) to perform specific functions for a linguistic service. For example, the proofing service 110 may include a spelling module 120 and a grammar module 122 and so on.

While the computer 102 is illustrated as including a processor 124 and memory 126, the processor 124 and/or the memory 126 may be representative of one or more devices, e.g., the processor 124 may be representative of a plurality of central processing units. Processor(s) are not limited by the materials from which they are formed or the processing mechanisms employed therein. For example, processor(s) may be comprised of semiconductor(s) and/or transistors (e.g., electronic integrated circuits (ICs)) that execute instructions to provide the application 104 and/or linguistic services 108. Sample processor mechanisms may include, but are not limited to, quantum computing, optical computing, mechanical computing (e.g., using nanotechnology) and so on.

Although one memory is illustrated, a wide variety of types and combinations of memory may be employed, such as random access memory (RAM), read only memory (ROM), hard disk memory, removable medium memory and other types of computer-readable media. The memory 126, for example, may be used to store instructions used by the processor(s) to provide the application 104 and/or linguistic services 108.

The computer 102 is illustrated as executing an operating system 128 on the processor(s), which is also storable in the memory 126. The operating system 128 may be representative of functionality to "abstract" underlying functionality of the computer 102. The operating system 128 may, for example, provide a foundation for the application 104 and/or linguistic services 108 to be executed on the computer 102 without having to "know" the specific configuration of the computer 102, e.g., which particular "kind" processor is employed by the computer 102, amounts of memory and so on.

The platform 106 may broker communication between the application 104 and the linguistic services 108. For example, the platform 106 may be configured to broker communications passing through the platform 106 such that the linguistic services 108 are obscured from the application 104. By obscuring the linguistic services 108 from the application 104, the linguistic services 108 may be changed or added without encoding the change or the addition into the application's code. In this manner, the linguistic services 108 may be independent from the application 104. For example, instead of configuring a first linguistic service to function for a specific application, the first linguistic service may be formed so that multiple applications may implement the first linguistic service, e.g., individual instances of the first linguistic service. Additional aspects of the platform 106 and associated benefits are discussed with respect to sample communication sessions between the application 104 and the linguistic services 108.

In one or more embodiments, a service manager 130 may be included in the computer 102. The service manager 130 may be representative of functionality to expose a way for users to manage the platform 106 and/or the linguistic services 108. For example, when a user installs a new linguistic service, the service manager 130 may be used to manage a plugin process to override a previously installed service. Thus, for example, when a new proofing service is installed, the service manager 130 may be used to manage the platform 106 and/or the linguistic services 108 so that text data for proofing is communicated to the new proofing service rather than a previous proofing service.

Figure 2:
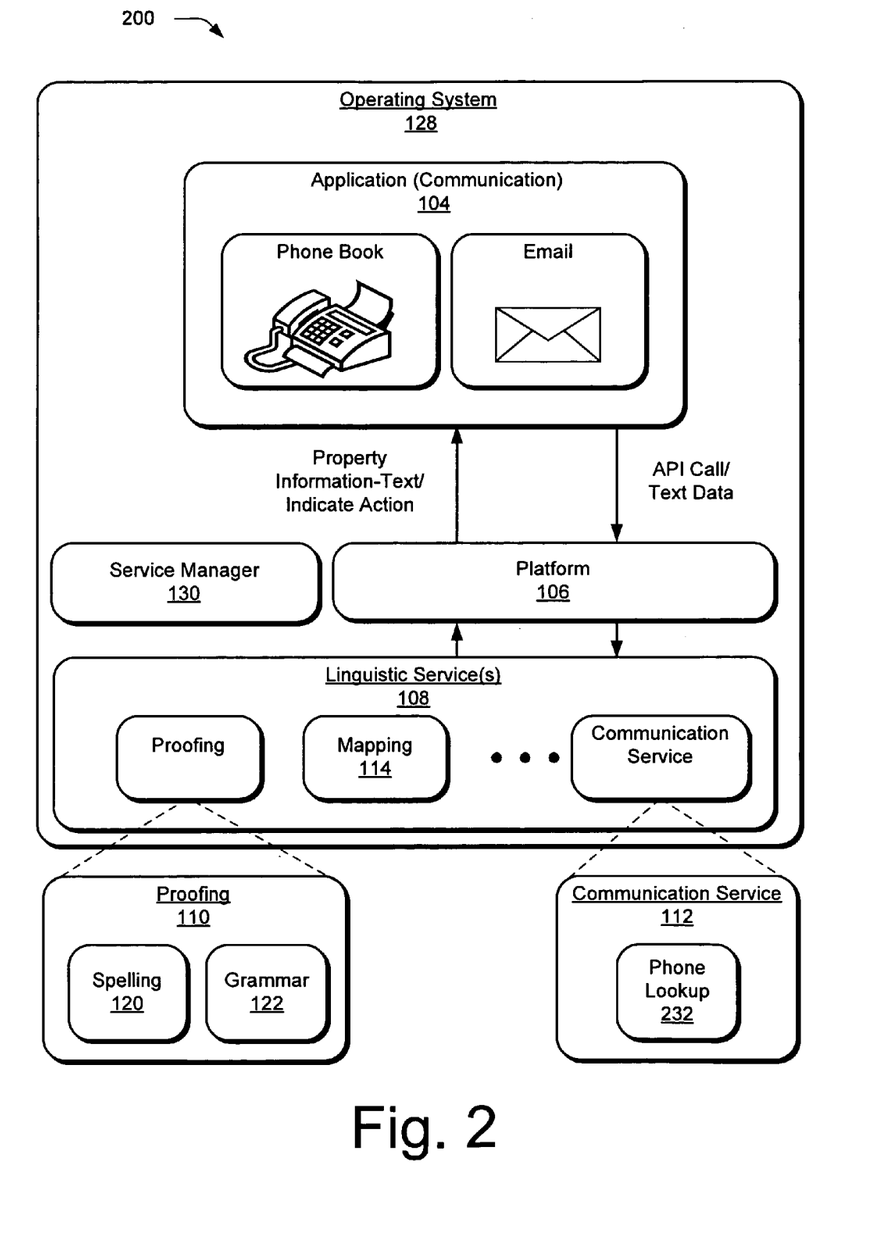
FIG. 2 is an illustration of a system in an example implementation in which a linguistic service is designated as available to an application through a platform.

Referring to FIG. 2, when initiating communication, the platform 106 may designate which linguistic services 108 (in system 200) are available for use by the application 104 (e.g., a communication application) based on a property of the linguistic service, e.g., a service property. For example, during an enumeration phase, the platform 106 may designate that the spelling property and a phone lookup property are available through the platform 106, rather than designating that the proofing service 110 and the communication service 112 are available for use by the application 104. By designating linguistic services 108 based on service properties, the platform 106 may obscure (e.g., conceal) the linguistic service providing the function to the application 104 (and vice versa). As a result, the application 104 may not be configured for a particular service in order to implement the functionality provided by the particular linguistic service. Although "a service property" is discussed, in one or more instances multiple service properties may be implemented.

For example, in response to receiving an application program interface (API) call, the platform 106 may designate the linguistic services available for use by the application 104. The platform 106 may designate that a particular linguistic service is available based on a service property of the particular linguistic service. In this way, the application 104 may not be tied to the particular linguistic service (e.g., the linguistic services 108 may be decoupled from the application 104) and the platform 106 may designate the available linguistic services without the application 104 issuing an API call specifying the particular linguistic service, e.g., an API call for the communication service 112. Moreover, the application 104 may use a limited number of API calls in comparison to issuing API calls tied to linguistic services.

In one or more embodiments, the application 104 may specify that linguistic services 108 are to be designated based on a service property specified in the API call. The application 104 may prescreen (e.g., filter) which linguistic services 108 are to be designated by specifying which service properties are relevant to the application 104. For example, a word processing application may specify that a spelling functionality is to be designated by issuing an API call specifying a spelling property. Accordingly, the platform 106 may not designate the communication service 112 because a phone lookup property was not specified in the API call. Having described designating linguistic services, communication and recognizing text property information are now discussed.

Figure 3:
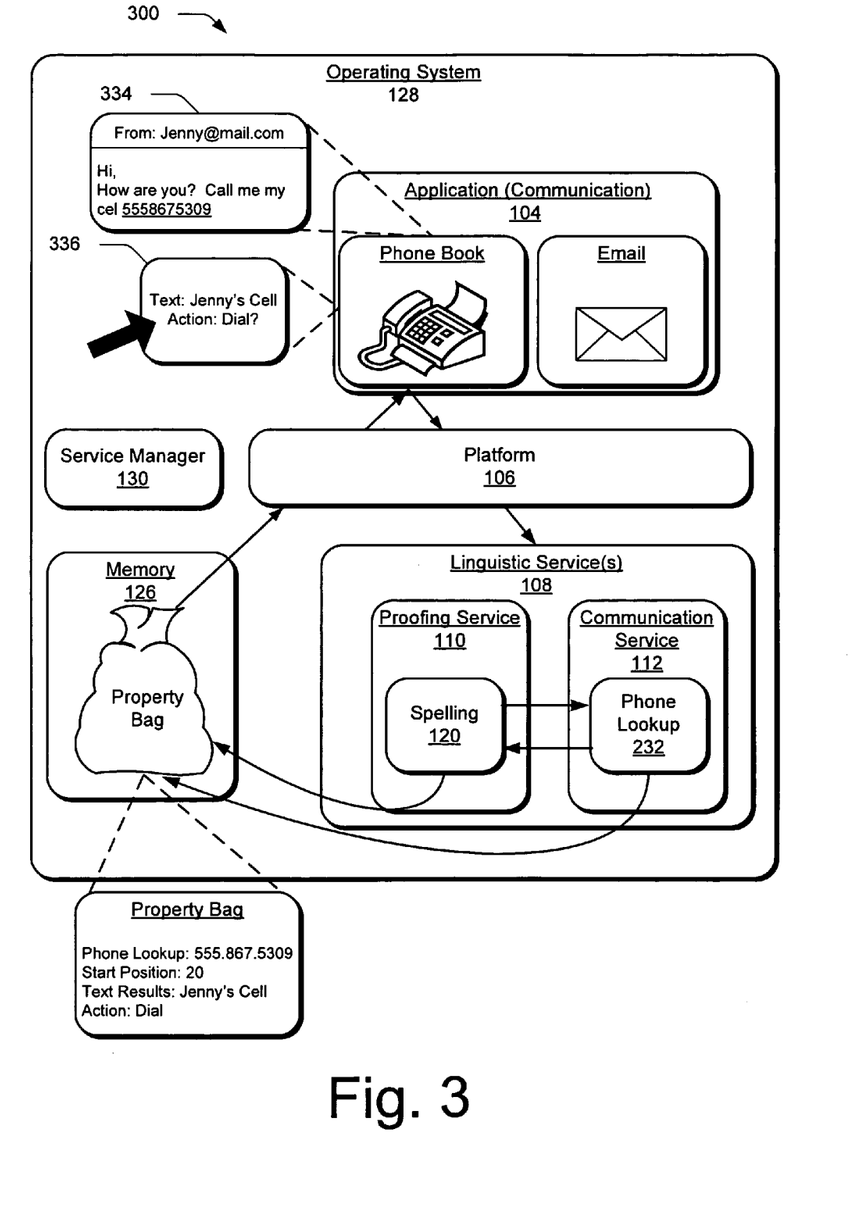
FIG. 3 is an illustration of an example implementation showing brokered communication that may be employed by a system of FIGS. 1 and 2.

Referring to FIG. 3, once the linguistic services are designated, the application 104 (in a system 300) may send a text 334 to a designated linguistic service for recognition. For example, the platform 106 may broker communication of the text 334 to the designated linguistic services. The platform 106, for example, may route or direct the text 334 to the proofing service 110.

The designated linguistic services may recognize text property information associated with text data in the text 334. For example, one of the linguistic services 108 may associate text property information with text data within range of the text 334, e.g., 8 bytes of data that start at a position 20 bytes into the text 334.

Consider for example, a session occurring between the application 104 (e.g., communication application) having the text 334, the proofing service 110 and the communication service 112. As illustrated, the text 334 may include a telephone number "5558675309" and the word "cel." The platform 106 may, for example, broker communication of the text 334 by directing the text 334 to the proofing service 110.

Upon receiving the text 334, the proofing service 110 may recognize text property information associated with text data within a range of the text 334 and return text property information to the application 104. For example, the proofing service 110 may recognize that the word "cel" is misspelled (e.g., "cel" is not in a dictionary) and that the word "cel" is an improper spelling of the word "cell." As a result, the proofing service 110 may populate the memory 126 (e.g., "property bag") with the text property information indicating that the text data is misspelled and the text data is the word "cell." The proofing service 110 may associate the foregoing text property information with a range occupied by the word "cel" in the email message. For example, the word "cel" may start at position 51 and go for three units in the text 334.

In the case of the communication service 112, upon receiving the text 334 (e.g., an email message), the communication service 112 may recognize that text data "5558675309" is a telephone number, e.g., the text data within the range occupied by "5558675309" corresponds to a telephone number. The range for the telephone number may, for example, start at position 55 in the text and have a length of 10 units. In response to recognizing the text data as a telephone number, a phone lookup module 232 may populate the memory 126 with caller identification information associated with the telephone number, e.g., "Jenny" and associate a range starting at position 55 with the term "Jenny".

With the text property information in the memory 126, the platform 106 may communicate the text data property information. For example, the proofing service 110 may store the text property information "cell" in memory 126 until the communication service 112 has recognized the telephone number—at which time, the word "cell" and the caller identification information, "Jenny," may be communicated to the application 104.

When the text data within the range has been altered (e.g., the text has been deleted or modified) since the associated text property information was stored in memory 126, the platform 106 may release the memory 126 storing the text property information. For example, the platform 106 may permit deletion or overwriting of a portion of the memory 126 storing the text property information when the associated text data has been altered.

In one or more embodiments, the linguistic services 108 may be configured to interact with other linguistic services through the platform 106. For example, the language detection service 118 may be used to designate the text data as, for example, German before requesting that a German proofing service spell-check the text data. In the foregoing situation, the language detection service 116 may return the recognized text property information (e.g., the text data is German) through the platform 106 to the German proofing service. In another example, the proofing service 110 may request that the language detection service 116 identify which human language is associated with the text data and return the text property information result to the proofing service 110.

In some implementations, the linguistic services 108 may be configured to form a callback to the application 104 upon recognizing the text property information. For example, the proofing service 110 may form and send the application 104 a callback that indicates that the memory 126 has been populated with text property information. In response, the application 104 may instruct the platform 106 to communicate the text property information.

In another implementation, the linguistic services 108 output the text property information in a format indicated by the application 104. For example, as part of initiating a session, the application 104 may indicate that the proofing service 110 is to return the text property information in hypertext markup language (HTML) format. In other implementations, the linguistic service 108 may return multiple versions of the text property information, e.g., as Unicode text and HTML. In further embodiments, the linguistic services 108 may output text property information in a format specific to one or more applications to accommodate interrelated applications.

In one or more embodiments, the linguistic services 108 may indicate that an action is associated with the text data within a range of the text. For example, the communication service 112 may indicate that text data "5558675309" is a telephone number and/or prompt the user via a user interface to initiate the communication service 112 to dial the telephone number 336. Having discussed techniques, approaches, interactions and functions associated with linguistic services and the platform 106, the script detection service 118 and the language detection service 116 will be discussed in-depth.

Figure 4:
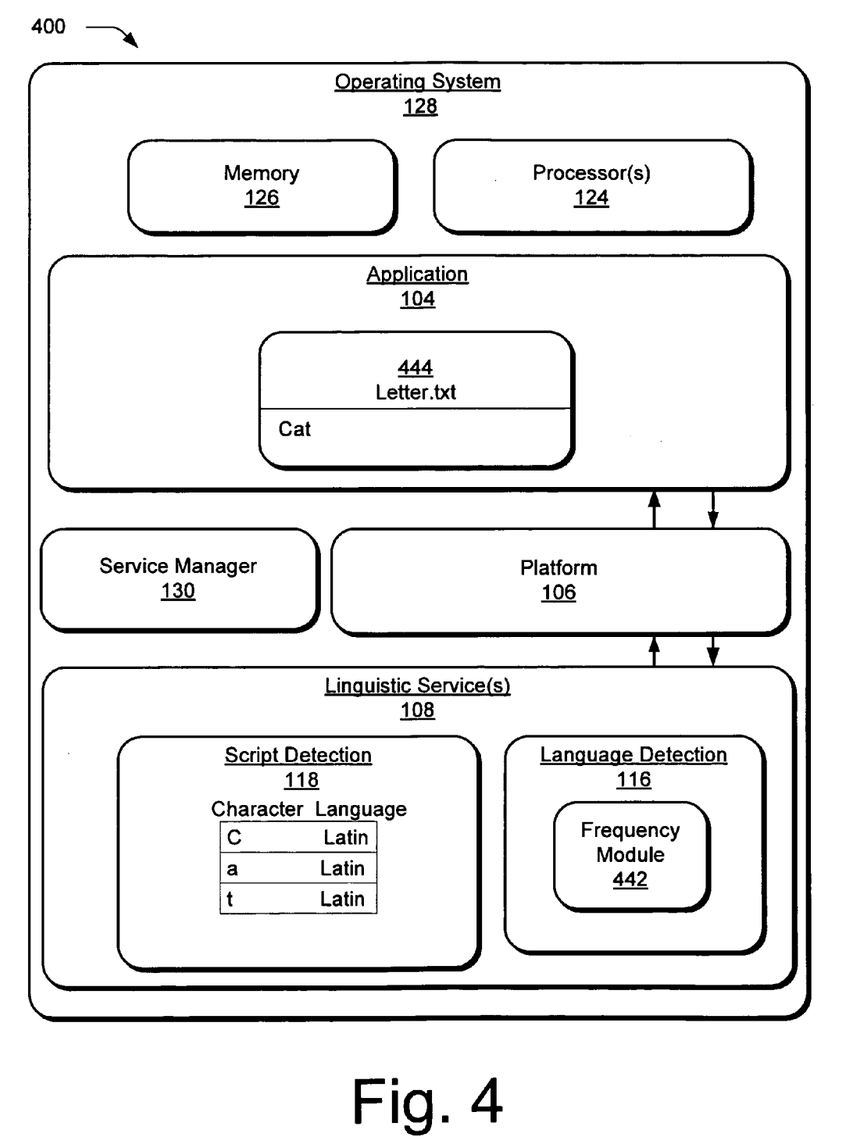
FIG. 4 is an illustration of an example implementation showing script detection techniques and language detection techniques that may be employed by a system of FIG. 1.

Referring to FIG. 4, as illustrated, a system 400 includes the script detection service 118 and the language detection service 116 having a frequency module 442. As described with respect to FIGS. 1-3, the script detection service 118 and/or language detection service 116 may be independent from the application 104 implementing the functions supported by the language detection service 116.

While the script detection service 118 may be described at times as being included in the language detection service, it is to be apparent that the script detection service 118 may be used independently. In some instances, for example, the script detection service 118 may be used independently to minimize the processing overhead associated with detecting which human language is associated with a text. For example, the script detection service 118 may be used to indicate what font choices are to be offered in a particular editing scenario.

The script detection service 118 is representative of functionality to determine which human writing system is associated with text characters in a string of one or more text characters (e.g., a string in question or the in-question string) based on values representing the text characters. With the values, the script detection service 118 may designate which human writing system is associated with the string including the text characters. For example, the script detection service 118 may determine that the text characters "c-a-t" are Latin text characters by scanning the values representing the text characters "c-a-t" 444. The script detection service 118 may use a table that associates values with human writing systems in making the determination. For example, the table may indicate that when the values are within a first subset of values the string is Chinese, while when the values are in a second subset of values the string is Thai. The script detection service 118 may make this determination (e.g., the text characters are Latin) based on the values assigned to the text characters "c-a-t". For example, in the Unicode standard the values representing the characters "c-a-t" are within a Latin text character subset of values.

While the Unicode standard (e.g., Unicode 5.1) is discussed with respect to the script detection service 118 and/or the language detection service 116, other standardized encoding systems are available (e.g., ASCII and so on) to handle text data in computing-type environments. Unicode is promulgated by the Unicode Consortium which is a non-profit organization (Unicode, Inc. Mountain View, Calif.).

In the Unicode standard, individual text characters are assigned numerical values that uniquely represent the text character. For example, the script detection service 118 may designate that a word in a processing document is Chinese by scanning the Unicode values representing the text characters in the word.

The script detection service 118 may indicate that a range of positions within the text for the one or more text characters included in the string. For example, the script detection service may form a communication including the text property information for the string, e.g., the particular human writing system and the range within the text occupied by the text characters included in the string. The range may be expressed as a starting position for the string and a length of the string, e.g., starting position 43 and 5 bytes long.

In some instances, the script detection service 118 may determine the values representing the text characters are unique to a single human writing system. For example, when the script detection service 118 determines text characters in a string are Thai (based on the values), the script detection service 118 may designate that the string is Thai and send this text property information to the application 104 (e.g., the text characters are Thai) because no other human writing system implements Thai characters.

In instances in which the values represent text characters that are associated with more than one human writing system, the script detection service 118 may forward this text property information (e.g., the text characters are Cyrillic) to the frequency module 442. When the values representing text characters in the string are Latin text characters, the script detection service 118 may indicate this text property information to the frequency module 442. The frequency module 442 may use the text property information (e.g., the text characters are Latin) to narrow which strings in a targeted dictionary are to be considered when comparing the string in-question to the targeted dictionary including a plurality of strings.

In other instances, when more than one human writing system is associated with the string in a text, the script detection service 118 may designate a particular human writing system is associated with the string when a first human writing system is based on another human writing system. For example, the script detection service may designate that a string including Japanese and Chinese characters is Japanese because some text characters in Japanese are based on Chinese text characters. In additional instances, the script detection service 118 may forward the string in-question to the language detection service 116 to associate a human language with the designation of the particular human writing system.

In one or more embodiments, the script detection service 118 may indicate that a service is available to perform a function. For example, having designated that a string is Cyrillic, the script detection service 118 may indicate that a Russian spelling service is available to check to see that the string is spelled properly. As should be apparent, the techniques, approaches, structures and so on employed by the script detection service may be implemented as part of or in conjunction with the language detection service 116 (discussed further below).

Figure 5:
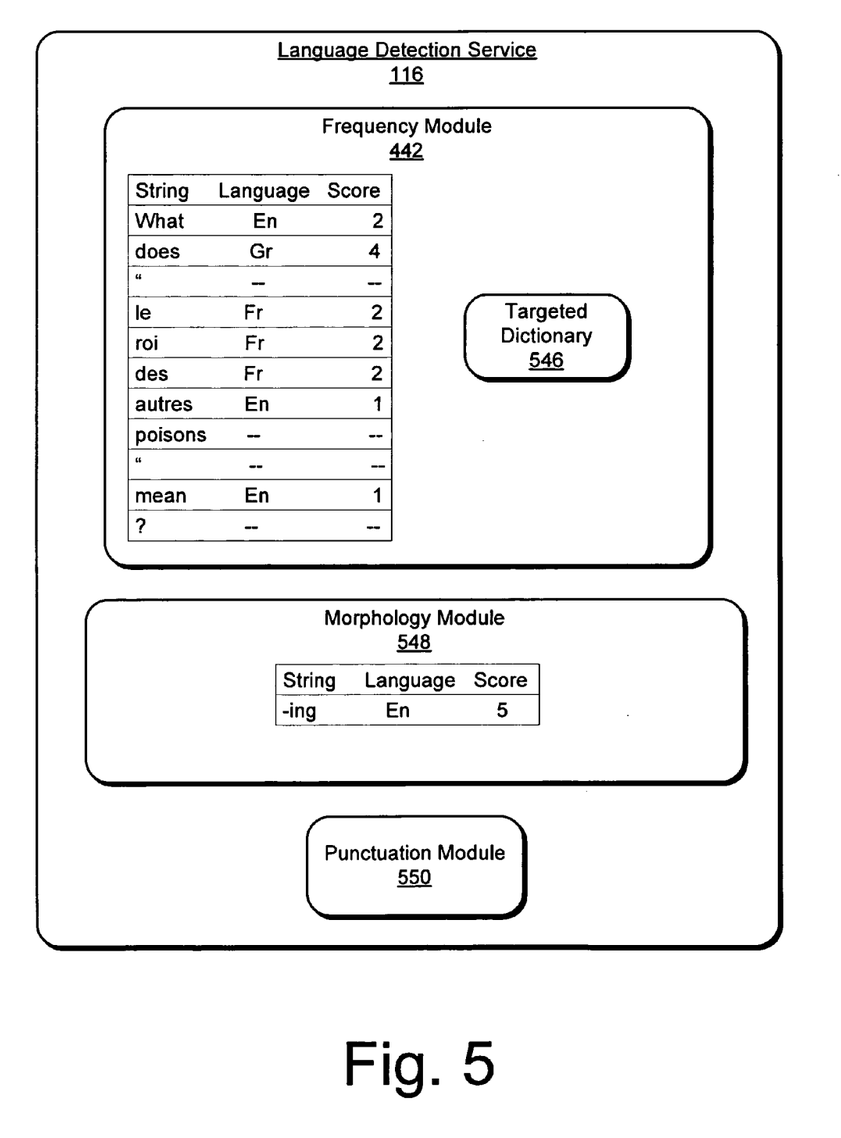
FIG. 5 is an illustration of a language detection service of FIG. 4.

Referring to FIG. 5, as illustrated the language detection service 116 includes the frequency module 442 which is representative of functionality to identify a particular human language associated with the string (e.g., an in-question string) and/or a text including the string by comparing the string to a targeted dictionary 546. For example, a targeted dictionary 546 may contain a plurality of strings (e.g., words) that are associated with a human language and that frequently occur in the human language in comparison to other strings. While words are described, in some instances a string may be a combination of words, such as "Memorial Day." In another example, a string may be a word along with punctuation, for example, while the string "the" may appear in a word (e.g., "them"), the word "the" with a space may be considered. Exemplary human languages may include French, German, Chinese, English, Italian, Spanish, Dutch and so on. For example, the frequency module 442 may compare the string with a plurality of strings in the targeted dictionary 546 to identify which human language corresponds with the text and/or string in-question.

In some implementations, what strings in the targeted dictionary are considered may be selected based on one or more of the values representing the text characters in the string. For example, when the script detection service 118 determines that the values represent Latin-based text characters, the script detection service 118 may inform the frequency module 442 so that strings using Latin text characters in the targeted dictionary 546 are used for comparison. In this way, the frequency module 442 may not consider strings in the targeted dictionary 546 that are associated with other human writing systems.

Having discussed use of the targeted dictionary 546, sample techniques are now discussed for populating the targeted dictionary 546 before discussing the use of the targeted dictionary 546 in-depth. While the construction and use of a targeted dictionary 546 are discussed with respect to the language detection service 116, it is to be apparent that the targeted dictionary 546 may be used in different environments and independently of the language detection service 116.

The targeted dictionary 546 may be populated with a plurality of strings that are individually associated with a human language. Strings may be associated with a human language, for example, because the string frequently occurs in the human language, the string is indicative of the human language, the string's role in the human language (e.g., does the string serve a function in the human language) and so on. In one or more embodiments, the plurality of strings in the targeted dictionary 546 may be assigned a weight according to the string's association with the language, e.g., is the string unique to the language. What strings are to be in the targeted dictionary 546 may be decided by analyzing corpora of text, e.g., a significant sampling of text in the human language.

In one or more embodiments, the targeted dictionary 546 may include strings, such as words, that serve functions in the language, e.g., determiners, prepositions, conjunctions (connectors) or pronouns. Exemplary determiners include, but are not limited to, "an," "a," "some," "each," "the," "der," "die" and "das" (determiners in English/German). Exemplary prepositions include, but are not limited to, "of," "in," "on," "by" and "to." Exemplary connectors include, but are not limited to, "and," "or," "but" and "if." Exemplary pronouns include, but are not limited to, "he," "she," "it," "they" and "her." The foregoing strings may be used because of the string's role in the language, e.g., a preposition indicates a relationship between items.

In some implementations, how frequently a string appears in the corpora of text may be used to assign a weight to the string in the targeted dictionary 546. For illustration, sample frequency weights may be (on a 0-10 scale) less than one percent (0); one percent (2); one to three percent (4); three to four percent (6); four to five percent (8); and five percent or greater (10). The word "she", for example, made be assigned a greater weight than another word as the word "she" frequently appears in English language text.

When weighing strings in the targeted dictionary 546, a string's association with the human language may be considered as part of populating the targeted dictionary 546. For example, some strings may be in the targeted dictionary 546 even though the string occurs less frequently (in comparison to other strings) because the string is indicative of the human language, e.g., linguistically distinct to the human language. For example, an indicative string may not appear in other human languages, e.g., related human languages.

When the targeted dictionary 546 contains weighted strings, individual strings may be assigned a weight based on how indicative the string is of the human language. For example, the word "the" may be given more weight for the English language in comparison to the word "or" because the word "or" appears in both French and English. Exemplary weightings based on linguistics may include but are not limited to: (weights are expressed in the range from minus two through plus two) a string is unique to one human language (+2); a string is included corpora of text for a second human language but in targeted dictionary for second human language (+1); a string is in corpora for less than two other human languages (0); a string is in corpora for between two to four other human languages (−1); and a string is in corpora for more than four other languages (−2).

In some implementations, the plurality of strings in the targeted dictionary may be weighted based on the length of the string, e.g., a number of text characters in the string. When comparing the strings "the" and "what" the word "what" may be assigned a higher weight as the word "what" includes four text characters, while the word "the" includes three text characters. Exemplary weightings based on a number of text characters in a string may include, but are not limited to, (from minus one to add two) one text character (0); two text characters (−1); three text characters (no change); four text characters (+1); and five or more text characters (+2).

In one or more embodiments, strings in the targeted dictionary 546 may be assigned an overall weight based on one or more of whether the string serves a function in the human language, how frequently the string occurs in the human language, the linguistic distinctiveness of the string and so on.

An overall number of strings in the targeted dictionary 546 may be based on which human languages are included. For example, a targeted dictionary 546 including a plurality of strings for the English language may include more strings than for another human language based on the frequency and/or linguistic distinctiveness of the included strings. The overall number of strings in the targeted dictionary 546 may be selected based on other considerations, such as an expected processing time, processing overhead and so on associated with comparing a string in-question to the plurality of strings in the targeted dictionary 546. For example, the targeted dictionary may include approximately 300 or less strings for a human language. While additional strings beyond approximately 300 or less strings may be included in the targeted dictionary 546, populating the targeted dictionary 546 with 300 or less strings may permit accurate language detection while minimizing an overall amount of time to compare the string in-question to the plurality of strings in the targeted dictionary 546.

When a human language does not have a sufficient amount of text to conduct analysis or when obtaining sample text is impractical, the analysis of another human language may be used to predict which strings from an under-represented language are to be in the targeted dictionary 546. For example, a targeted dictionary 546 for a human language may include function words from the "under represented language" based on an analysis of another human language, e.g., a related human language. For example, rather than analyzing Kyrgyz text (a written language using modified Cyrillic and Arabic scripts), the targeted dictionary 546 may be populated with strings representing function words in Kyrgyz. Having described populating the target dictionary 546, use of the targeted dictionary 546 is now described.

When using the targeted dictionary 546 with weighted strings, a human language associated with the text (including one or more in-question strings) may be weighed as part of identifying the particular human language associated with the in-question string or the text including the in-question string. Consider, for example, the in-questions strings in the text (e.g., sentence) "What does "le roi des autres poisons" mean?" When comparing the in-question strings forming the text, the frequency module 442 may identify the particular human language by scoring the weighted values for the strings in the text. For example, the frequency module 442 may identify the text "What does "le roi des autres poisons" mean?" as English by summing the weighted values for the strings in the sentence. Thus, if the strings are assigned the following values: What (5) does (2) le (4) des (2) the sentence is identified as English even though the text includes the French words "le roi des autres poisons."

When identifying the particular language, the frequency module 442 may be configured to check the first text character in the string in-question and lookup whether the targeted dictionary 546 includes a string that begins with the first text character. For example, when the script detection service 118 forwards "this is Latin" to the frequency module 442, the targeted dictionary 546 may be selected to include an English table including a plurality of strings for English, a German table including a plurality of strings for German and so on.

When the first text character in the string is not in the targeted dictionary 546 (e.g., in the English or German tables), the frequency module 442 may ignore the string and consider a second string when identifying which human language is associated with the text. When the first character in the in-question string is in both the English and German tables, a second text character may be considered and so on. When the string in question is "apple", the first three characters may be considered (when the English word "apple" is in the English table and the word "apfel" or another word starting with the text characters "ap" is in the German table. After eliminating German as a potential human language, the frequency module 442 may confirm the string is "apple" and the English language is identified. As a result, the frequency module 442 may follow a binary tree approach when comparing the in-question string to the plurality of strings in the targeted dictionary.

In some embodiments, when text and/or string in question are associated with more than one language, the language detection service 116 may communicate an ordered list of the human languages to the application 104. For instance, in the "What does "le roi des autres poisons" mean?" example the text property information may be (1) English and (2) French.

In one or more embodiments, the language detection service 116 includes a morphology module 548. The morphology module 548 is representative of functionality to ascertain the human language associated with the string based on a substring. Some strings include substrings (e.g., suffixes or prefixes) that are indicative of a human language. For example, the suffix "-ing"(e.g., a gerund form of a word) may be associated with the English language. The morphology module 548 may ascertain the human language associated with the string even though the whole string is not in the targeted dictionary 546. While, for example, the frequency module 442 may not identify the string "playing" because the string "playing" is not in the targeted dictionary 546, the morphology module 548 may ascertain the string "playing" is associated with the English language based on the suffix "-ing" which is parsed from "playing".

In some implementations, the language detection service 116 includes a punctuation module 550. The punctuation module 550 is representative of functionality to identify which human language is associated with the string in-question and/or the text by examining punctuation in the text. For example, in the sentence "What does "le roi des autres poisons" mean?" the punctuation module 550 may associate the text and/or in-questions strings with the English language by examining one or more of, blank spaces (e.g., no text character) capitalized text characters, punctuation marks and so on.

In additional implementations, the frequency module 442, the morphology module 548 and/or the punctuation module 550 may be used in a serial configuration, in parallel configuration and so on. In other embodiments, the frequency module 442 may be used, while the morphology module 548 and the punctuation module 550 may be used if one or more of the text or the string is of a certain size or if the frequency module 442 returns a "tie", e.g., two human languages are identified.

The components, service, modules, functions and techniques discussed above may be implemented singly or in combination based on design preference. Generally, any of the modules, services and functions described herein can be implemented using software, firmware, hardware (e.g., fixed logic circuitry), manual processing or a combination of these implementations. The terms "module," "functionality," and "logic" as used herein generally represent software, firmware, hardware or a combination thereof. Additionally, functions can be embodied as executable instructions that are included in one or more computer-readable storage media.

Example Procedures

The following discussion describes transformation procedures that may be implemented utilizing the previously described structures, modules, approaches and techniques. Aspects of the procedures may be implemented in hardware, firmware, software or a combination thereof. The procedures are shown as a set of blocks that specify operations performed by one or more devices and are not necessarily limited to the orders shown for performing the operations by the respective blocks.

Figure 6:
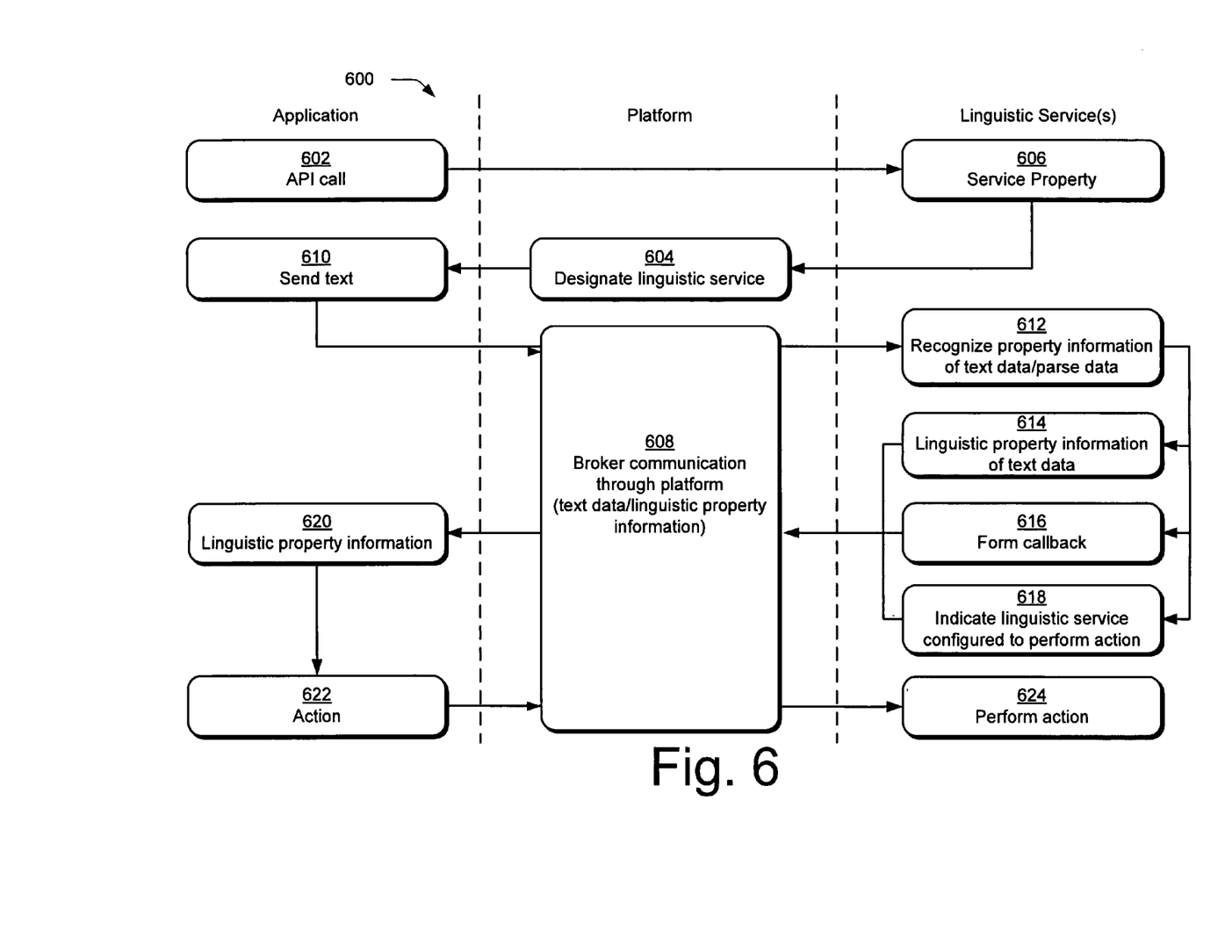
FIG. 6 is a flow diagram depicting a procedure in an example implementation in which an application and a linguistic service communicate through a platform.

FIG. 6 depicts a procedure 600 in an example implementation in which an application and one or more linguistic services communicate through a platform. For example, the procedure may be performed by the computer 102 including the application 104 and the platform 106 discussed with regard to FIGS. 1-4.

An API call requesting one or more linguistic services, based on a property of the linguistic services, is issued (block 602). In one or more embodiments, the API call specifies which service properties the application 104 wants to use. In other instances, the API call may be a general request to interact with the linguistic services available through the platform 106.

Responsive to the API call, the linguistic services that are available are designated (block 604). For example, the platform 106 may designate the linguistic services 108 that have a service property specified in the API call (e.g., a spelling property) are available to recognize text property information associated with text data. The designation of the linguistic service 108 based on one or more service properties may obscure the linguistic services 108 from the application 104 (and vice versa). In the foregoing manner, the application 104 may not be specifically configured for the linguistic service 108. For example, instead of designating the proofing service 110, the platform 106 may designate the proofing service 110 based on a spelling property and a grammar property. In addition, this approach may minimize the number of different APIs used by the application in comparison to issuing API calls for a linguistic service.

In some embodiments, the platform may obtain the property of the linguistic service from the linguistic service in response to receiving the API call (block 606). In other embodiments, the platform 106 may have the property of the linguistic service 108 as the linguistic service may be a plugin to the platform 106.

In one or more embodiments, the API call may indicate that the linguistic service 108 is to output text property information in a particular format. For example, the application 104 may request that text property information is to be output in HTML format.

Once a session is initiated, the text including text data may be communicated through the platform (block 608). For example, the platform may broker communication of text (e.g., the email message) (block 610) passing through the platform. The platform 106 may, for example, direct communications between the application 104 and/or linguistic services 108. In some embodiments, the platform 106 may broker communications between linguistic services performing functions for the application 104. For example, the grammar service 122 and the language detection service 116 may communicate through the platform 106.

Text property information associated with text data in a text is recognized (block 612). For example, the communication service 112 may recognize text property information associated with text data within a range of text communicated from the application 104 through the platform 106.

Upon recognizing text property information associated with text data, the text property information may be communicated to the application (block 614). For example, the linguistic service 108 may populate the memory 126 with the text property information associated with text data. The text data information may be stored in the memory 126 until the platform communicates (block 608) the text property information to the application.

In one or more embodiments, a callback may be formed (block 616) for communication to the application (block 608). For example, when the application 104 is configured for a-synchronic communication, the linguistic service 108 may form the callback to inform the application 104 that recognition is complete.

In some embodiments, when an action is associated with the text data, the recognized text property information may include an indication (e.g., an actionID) that the linguistic service may perform the action (block 618). For example, if an email address is recognized in a word processing document the communication service 112 may indicate that the linguistic service 108 can send an email message to the email address.

With the text property information (block 620), the application may initiate the action (block 622) for performance by the service (block 624). In the previous word processing document example, the application may display a user interface that permits initiation of the action, e.g. create an email message targeting the email address.

Figure 7:
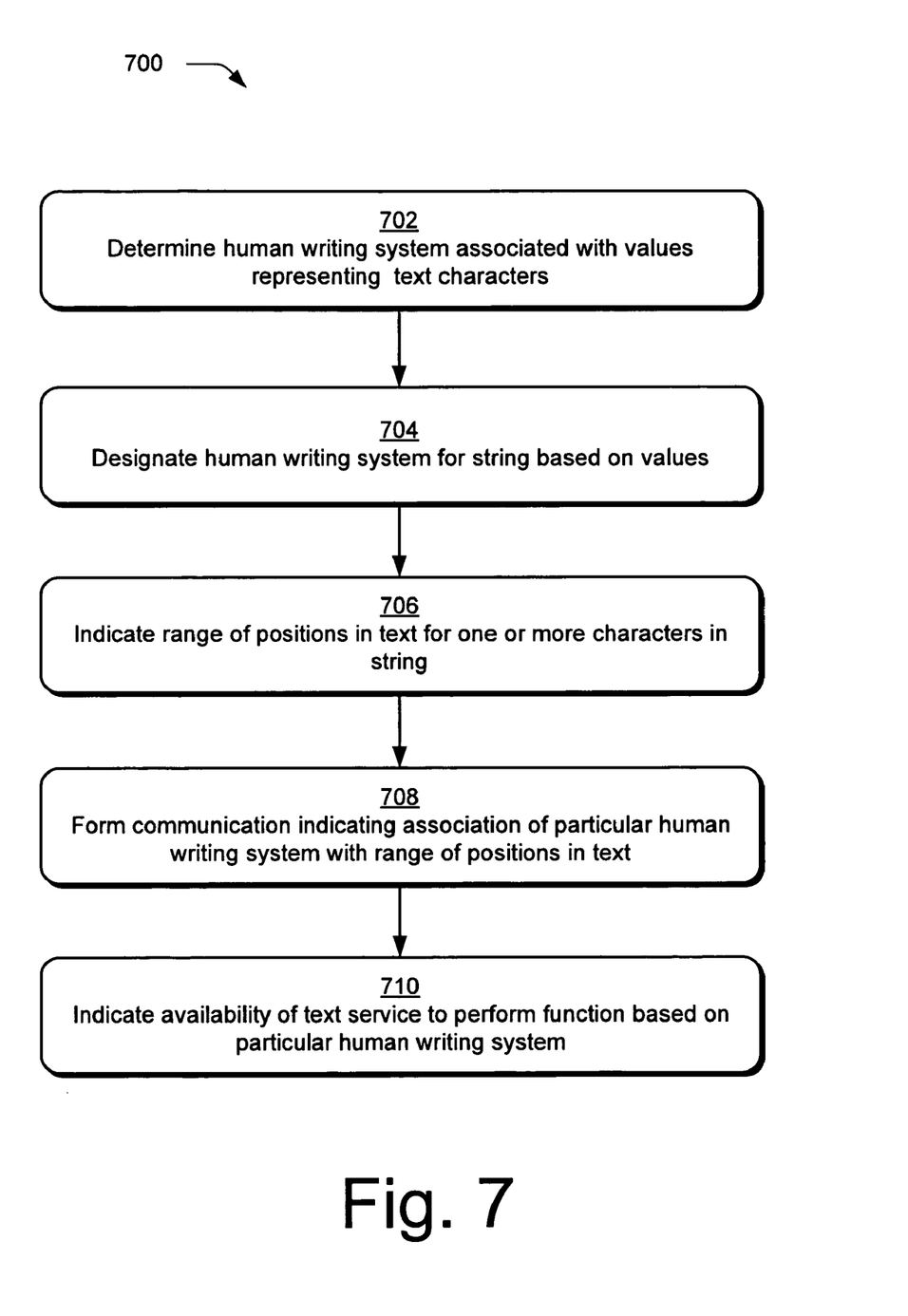
FIG. 7 is a flow diagram depicting a procedure in an example implementation in which script detection is employed.

FIG. 7 depicts a procedure in an example implementation in which script detection may be used to designate a particular human writing system associated with a string (e.g., an in-question string) in a text.

A determination is made as which human writing system is associated with individual text characters in a string of one or more characters (block 702). For example, the determination may be made by scanning values representing the individual characters to check the values against a table that associates subsets of values with individual human writing systems. For example, while Latin text characters are within a first subset of values, Chinese text characters may be within a second subset of values. Thus, when scanning the string "c-a-t" against the table, the determination may yield human writing systems using Latin text characters.

A designation as to which particular human writing system is associated with the string may be based on the human writing systems associated with the individual text characters in the string (block 704). When the text characters in the string are associated with, for example, Korean the string may be designated as Korean. In the case of a string including Korean text characters, the determination may be definitive as no other human writing system uses Korean text characters.

When the string includes text characters that are associated with a base language and text characters that are associated with a language that incorporates text characters from the base language (e.g., a child language), the child language may be identified. When a string includes both Chinese text characters and Japanese text characters, in some instances, the string may be designated as Japanese. In other examples, language detection techniques may be used to break the "tie."

In one or more embodiments, an indication may be made as to which range of positions within the text are occupied by the text characters (block 706) and a communication may be formed that associates the range of positions with the particular human writing system (block 708). For example, the communication may include the text property "this is Chinese text" along with the range of positions occupied by the Chinese text characters in the string. In some instances, this communication may be returned to the application 104 via the platform and/or may be forwarded to a service, e.g., the language detection service 116.

In some instances, the method 700 may include indicating the availability of a service to perform a function associated with the characters in the string based on the particular language (block 710). Thus, when the string is designated as Thai, a Thai spell-checker may be indicated.

Figure 8:
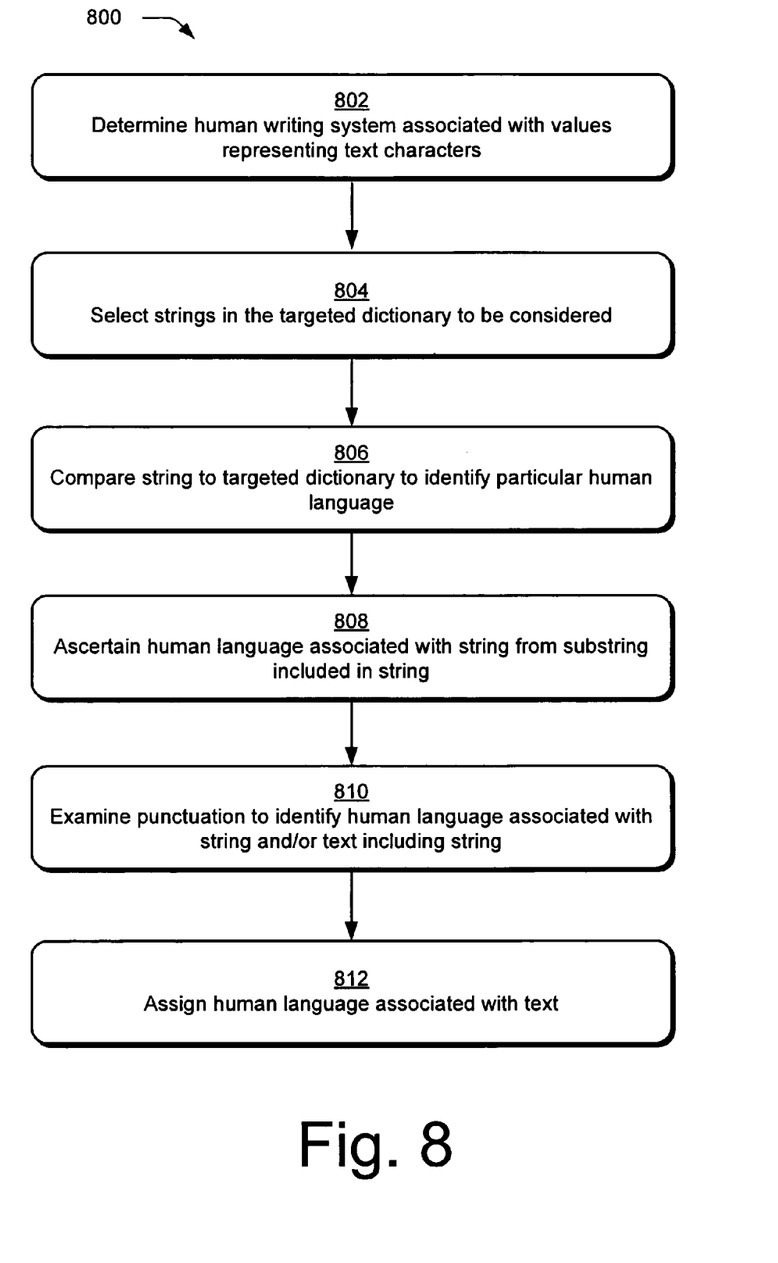
FIG. 8 is a flow diagram depicting a procedure in an example implementation in which language detection is employed.

FIG. 8 depicts a procedure 800 in an example implementation in which a human language is detected for a text and/or one or more strings in the text. The text may be provided by the application 104 through the platform 106 as described with respect to FIG. 6. For example, the text "What does "le roi des autres poisons" mean?" may be provided by the application 104 for language detection.

As discussed with respect to FIG. 7, a determination may be made as to which human writing system is associated with text characters in an in-question string based on values representing the text characters (802). As a result, the human writing system associated with the text characters in the in-question string may be determined by scanning the values representing the text characters. For example, Latin text characters are in a first set of values, while Chinese text characters are in another set of values. The determination of the human writing system associated with the text characters may be definitive for some human writing systems, e.g., Korean (as no other human writing system makes use of Korean text characters). In other instances, the values may represent text characters that are common to more than one language, e.g., Latin text characters are used by German, Spanish, French and so on.

The human writing system associated with the string by the determination may be used to select which strings in the targeted dictionary are to be considered when comparing the in-question string to a targeted dictionary (804). While the targeted dictionary may include strings associated with a multitude of human languages, the in-question string may not be compared to some of the strings in the targeted dictionary because the strings are associated with human languages that do not match the text characters used in the in-question string.

When the values are associated with more than one human writing system, a comparison of the string in-question with the targeted dictionary is preformed to identify the human language corresponding to the string in-question and/or the text including the string. For example, the string may be compared to the targeted dictionary 546 to identify the human language that is associated with the text and/or the string in-question. For example, an individual string in the targeted dictionary 546 may be associated with a single human language. The comparison a may be done on a weighted basis, such as by weighing the string included in the text. The contents of the targeted dictionary 546 and populating the targeted dictionary 546 with a plurality of strings are discussed with respect to FIGS. 4 and 5.

In some implementations, the human language associated with the string in-question/and or text may be ascertained from a substring in the string (block 808). For example, the human language associated with the string is ascertained by parsing a prefix or a suffix in the string. By ascertaining the human language from a substring in the in-question string, the human language associated with the string may be discovered even though the string was not identified based on the string itself. In further instances, this approach may be used to confirm the identification based on comparing the string to the plurality of strings in the targeted dictionary 546. By ascertaining which human language is associated with the string based on the substring, the number of strings used to identify which human language is associated with the text may be reduced in comparison to not considering a substring in the string. For example, this may shorten the length of a sentence that can be identified.

In additional implementations, an examination is performed to identify which human language is associated with the text and/or the in-question string from punctuation included in the text (block 810). For example, in the sentence "What does "le roi des autres poisons" mean?" the punctuation module may associate the text and/or included strings with the particular language by examining one or more of, blank spaces (e.g., no text character) capitalized text characters, punctuation marks and so on.

An assignment may be made as to which human language is associated with the text based on the particular language associated with the string in-question (block 810). In the "What does "le roi des autres poisons" mean?" example the text (e.g., the sentence) is assigned the English language from the comparison of the strings in-question with the targeted dictionary.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
   determining, by one or more computing devices, which human writing system is associated with text characters in a string of one or more text characters based on values representing the text characters; and
   when said values are associated with more than one human language, comparing, by one or more computing devices, the string with a targeted dictionary to identify a particular said human language associated with the string.

2. The method of claim 1, further comprising ascertaining which said human language is associated with the string based on which said human language is associated with a substring in the string.

3. The method of claim 2, wherein the substring is one or more of a prefix or a suffix.

4. The method of claim 1, further comprising assigning a text including the string the particular said human language.

5. The method of claim 1, wherein the targeted dictionary includes strings individually associated with a single said human language.

6. The method of claim 1, wherein individual strings in the targeted dictionary are associated with a single human language and comprise one or more of a determiner, a preposition, a connector or a pronoun.

7. The method of claim 1, further comprising selecting which of a plurality of strings in the targeted dictionary are to be compared based on said values representing the text characters in the string.

8. The method of claim 1, wherein in said values are Unicode said values.

9. A system comprising:
   at least a memory and a processor to implement a language detection service, the language detection service configured to:
   identify which human writing system is associated with a string of text characters in a text based on values representing the text characters;
   when the values are associate with more than one human language, identifying a particular said human language associated with the string by comparing the string with a targeted dictionary including a plurality of strings associated with the more than one said human language; and
   select which of the plurality of strings in the targeted dictionary are to be compared based on the values representing the text characters in the string.

10. The system of claim 9, wherein the language detection service is independent of an application providing the text.

11. The system of claim 9, wherein the plurality of strings in the targeted dictionary are individually associated with a single said human language.

12. The system of claim 9, wherein the plurality of strings includes individual said strings that are one or more of a determiner, a preposition, a connector or a pronoun.

13. The system of claim 9, wherein the language detection service is further configured to ascertain which said human language is associated with the string from which said human language is associated with a substring in the string.

14. One or more tangible computer-readable media comprising instructions that are executable by a computer to:
   determine which human writing system is associated with a string of text characters based on numerical values representing the text characters in the string; and
   when the numerical values are associated with more than one human language, compare the string with a targeted dictionary, including a plurality of strings, in which individual said strings in the targeted dictionary are associated with a corresponding said human language, to identify the corresponding said human language associated with the string.

15. One or more tangible computer-readable media as described in claim 14, wherein the instructions are further executable to ascertain which human language is associated with a substring in the string to identify which said human language is associated with the string.

16. One or more tangible computer-readable media as described in claim 14, wherein the instructions are further executable to select which of the plurality of strings in the targeted dictionary are to be compared based on the numerical values.

17. One or more tangible computer-readable media as described in claim 14 wherein the targeted dictionary includes individual said strings that are associated with a single said human language.

18. One or more tangible computer-readable media as described in claim 14, wherein the plurality of strings includes one of more of a determiner, a preposition, a connector or a pronoun.

19. One or more tangible computer-readable media as described in claim 14, wherein each string in the targeted dictionary is associated with a single human language.

* * * * *